US009635346B2

(12) United States Patent
Iida

(10) Patent No.: US 9,635,346 B2
(45) Date of Patent: Apr. 25, 2017

(54) AUTONOMOUS VEHICLE, AND OBJECT RECOGNIZING METHOD IN AUTONOMOUS VEHICLE

(71) Applicant: MURATA MACHINERY, LTD., Kyoto-shi, Kyoto (JP)

(72) Inventor: Masaomi Iida, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 185 days.

(21) Appl. No.: 14/636,406

(22) Filed: Mar. 3, 2015

(65) Prior Publication Data

US 2015/0347840 A1     Dec. 3, 2015

(30) Foreign Application Priority Data

May 27, 2014  (JP) .................................. 2014-109258

(51) Int. Cl.
*H04N 13/02*     (2006.01)
*G06T 7/11*      (2017.01)
(Continued)

(52) U.S. Cl.
CPC ......... *H04N 13/0203* (2013.01); *B66F 9/063* (2013.01); *G01B 11/24* (2013.01);
(Continued)

(58) Field of Classification Search
CPC ........ B66F 9/063; G01S 17/023; G01S 17/89; G01S 7/4808; G01S 17/00; G01B 11/24;
(Continued)

(56) References Cited

U.S. PATENT DOCUMENTS 5,812,395 A * 9/1998 Masciangelo .......... B25J 9/1697
                                              187/222
5,938,710 A * 8/1999 Lanza ..................... B66F 9/063
                                              180/169
(Continued)

FOREIGN PATENT DOCUMENTS

| JP | 09-218014 A   | 8/1997  |
| JP | 2009-129058 A | 6/2009  |
| JP | 2011-215055 A | 10/2011 |

*Primary Examiner* — Siamak Harandi
*Assistant Examiner* — Menatoallah Youssef
(74) *Attorney, Agent, or Firm* — Keating & Bennett, LLP

(57) ABSTRACT

An autonomous vehicle includes a travel vehicle main body, a model data storage, a photographic device, a search region determiner, an image feature point detector, a feature amount calculator and a position detector. The travel vehicle main body autonomously travels to a target position. The model data storage stores model data related to a geometric feature of an object. The photographic device photographs a periphery of the travel vehicle main body at the target position to acquire image data. The search region determiner predicts a position of the object based on the image data, and determines a search region of a predetermined range including the predicted position of the object. The image feature point detector detects a feature point of the image data with respect to the search region. The feature amount calculator calculates a feature amount of a matching candidate point extracted from the feature point. The position detector matches the feature amount of the matching candidate point with the model data to recognize the position of the object based on the image data.

16 Claims, 12 Drawing Sheets

(51) Int. Cl.
*G05D 1/02* (2006.01)
*G06K 9/00* (2006.01)
*G01B 11/24* (2006.01)
*B66F 9/06* (2006.01)
*G01S 17/02* (2006.01)
*G01S 17/89* (2006.01)
*G01S 7/48* (2006.01)
*G06T 7/73* (2017.01)
*G06T 7/593* (2017.01)

(52) U.S. Cl.
CPC .......... *G01S 7/4802* (2013.01); *G01S 7/4808* (2013.01); *G01S 17/023* (2013.01); *G01S 17/89* (2013.01); *G05D 1/0225* (2013.01); *G05D 1/0246* (2013.01); *G06K 9/00214* (2013.01); *G06T 7/11* (2017.01); *G06T 7/593* (2017.01); *G06T 7/73* (2017.01); *H04N 13/0239* (2013.01); *H04N 13/0271* (2013.01); *G05D 2201/0216* (2013.01); *G06T 2207/10012* (2013.01)

(58) Field of Classification Search
CPC .......... G06K 9/00214; H04N 13/0239; H04N 13/0271; G05D 1/0246; G06T 7/0042; G06T 2207/10012; G06T 7/0075; G06T 7/0081
See application file for complete search history.

(56) References Cited

U.S. PATENT DOCUMENTS

| | | | |
|---|---|---|---|
| 2012/0126000 A1* | 5/2012 | Kunzig | G06Q 10/087 235/385 |
| 2012/0146789 A1* | 6/2012 | De Luca | G08B 21/12 340/540 |
| 2013/0101230 A1* | 4/2013 | Holeva | G06T 7/0085 382/202 |
| 2014/0074341 A1* | 3/2014 | Weiss | B66F 9/063 701/25 |

* cited by examiner

FIG. 7A    FIG. 7B    FIG. 7C
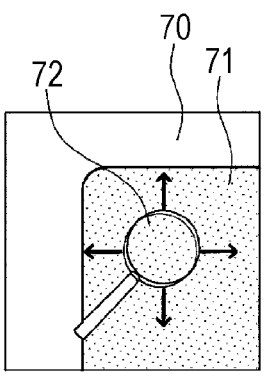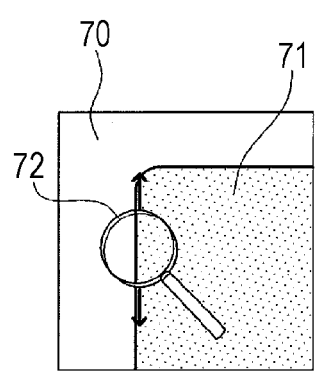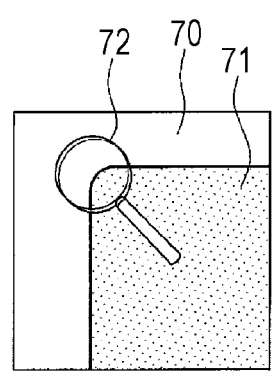
FIG. 7D
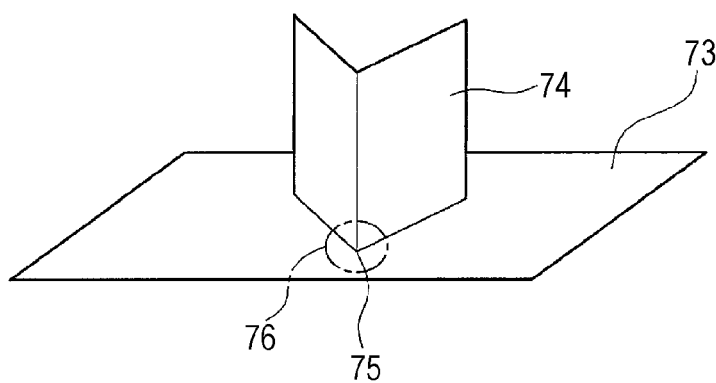

AUTONOMOUS VEHICLE, AND OBJECT RECOGNIZING METHOD IN AUTONOMOUS VEHICLE

CROSS-REFERENCE TO RELATED APPLICATIONS

This application claims priority under 35 U.S.C. 119 to Japanese Patent Application No. 2014-109258, filed on May 27, 2014, which application is hereby incorporated by reference in its entirety.

BACKGROUND OF THE INVENTION

1. Field of the Invention

The present invention relates to an autonomous vehicle, and an object recognizing method in the autonomous vehicle.

2. Description of the Related Art

An autonomous vehicle that autonomously moves in an environment needs to recognize a position of an object, a direction in which the object is located, and the like in order to realize a mutual action with the object existing in surrounding environments. For example, an unmanned forklift that automatically transports an object, such as a pallet, which is a target, includes a navigator, a camera, and an object recognizing device. The navigator performs a travel control along a path. The camera captures images of the periphery of the navigator. The object recognizing device recognizes the position of the pallet from image data captured with the camera. The unmanned forklift travels up to a target position in accordance with the travel control of the navigator, recognizes the position and the posture of the pallet based on the image data captured with the camera, and executes processes such as transportation of the pallet.

The object recognizing device adapted to recognize the object from the image data captured with the camera is disclosed, for example, in Japanese Patent Application Laid Open H09-218014. The object recognizing device extracts a feature point in the image data, and compares similarity degrees between the feature point and model data of the object to recognize the position of the object. If all the feature points in the image data are to be compared with the model data, high-speed process cannot be carried out. If the number of feature points to be compared is reduced, on the other hand, the recognition accuracy deteriorates.

In particular, the autonomous vehicle such as the unmanned forklift receives data associated with a pallet position and a travel path from a current position of the vehicle to the pallet position, and is travel-controlled based on the received data. The pallet position is a section where the pallet is to be placed in a warehouse, for example, and does not include information on what kind of posture the pallet is placed in. Furthermore, there may be a shift between the travel control of the navigator and the actual travelling. Thus, a range for extracting the feature point needs to be widened to correctly recognize the position of the object in the image data, and as a result, the high-speed processing becomes difficult.

SUMMARY OF THE INVENTION

According to preferred embodiments of the present invention, an object recognition in an autonomous vehicle is processed at high speed, and recognition accuracy is maintained high.

A plurality of various preferred embodiments of the present invention will be described below and features of which can be combined as necessary or desired.

An autonomous vehicle according to one aspect of various preferred embodiments of the present invention includes a travel vehicle main body, a model data storage, a photographic device, a search region determiner, an image feature point detector, a feature amount calculator and a position detector. The travel vehicle main body autonomously travels to a target position. The model data storage stores model data related to a geometric feature of an object. The photographic device photographs a periphery of the travel vehicle main body at the target position to acquire image data. The search region determiner predicts a position of the object based on the image data, and determines a search region of a predetermined range including the predicted position of the object. The image feature point detector detects a feature point of the image data with respect to the search region. The feature amount calculator calculates a feature amount of a matching candidate point extracted from the feature point. The position detector matches the feature amount of the matching candidate point with the model data to recognize the position of the object based on the image data.

In the autonomous vehicle, the feature points in which the feature amount is calculated by the feature amount calculator are within the search region determined based on the predicted position of the object, so that the number of matching candidate points is reduced. As a result, the computation load is reduced, and the recognition accuracy is improved.

The autonomous vehicle according to one aspect of various preferred embodiments of the present invention preferably further includes a posture information calculator configured to calculate current posture information. In this case, the search region determiner predicts the position of the object based on the image data based on the current posture information calculated by the posture information calculator.

The position detector preferably extracts a plurality of feature points satisfying a specific geometric condition from among the feature points as the matching candidate points. In this case, the feature point is extracted from the image data according to the geometric condition specified based on the feature of the object, and thus the matching candidate point that is matched with the model data is reduced and the computation load is also reduced.

When some of the plurality of feature points satisfying the specific geometric condition do not exist in the search region, the search region determiner preferably enlarges the search region to the periphery of the search region to detect the feature point.

In the case where some of the feature points indicating the feature of the object are outside the search region in the image data, the search region preferably is enlarged to the periphery of the search region to detect a group of feature points satisfying the specific geometric condition. In such a case, the image feature point detector enlarges the search region to the vicinity thereof, and detects the matching candidate point having high similarity degree with the model data. Thus, highly accurate object recognition is possible.

When a similarity degree with respect to the model data of the matching candidate point existing in the search region is low, the search region determiner preferably enlarges the search region to the periphery of the search region and the position detector preferably again extracts the matching candidate point.

When all or some of the feature points of the object that may become the matching candidate point are outside the search region in the image data, a matching candidate point having high similarity degree with the model data may not be obtained. In such a case, the image feature point detector preferably enlarges the search region to the periphery of the search region to detect the feature point, and again extracts the matching candidate point. Thus, highly accurate object recognition is possible.

An object recognizing method according to another aspect of various preferred embodiments of the present invention is performed in an autonomous vehicle including a travel vehicle main body. The object recognizing method includes the steps of autonomously travelling to a predetermined position, storing model data related to a geometric feature of an object, photographing a periphery of the travel vehicle main body at the predetermined position to acquire image data, predicting a position of the object based on the image data and determining a search region of a predetermined range including the predicted position of the object, detecting a feature point of the image data with respect to the search region, calculating a feature amount of a matching candidate point extracted from the feature point, and matching the feature amount of the matching candidate point with the model data to recognize the position of the object based on the image data.

In the object recognizing method, the travel vehicle main body autonomously travels to the predetermined position, and then the image data of the periphery of the travel vehicle main body is acquired. The search region is then determined, and the feature point of the image data is detected. The feature amount of the matching candidate point extracted from the feature point is then calculated, and the feature amount of the matching candidate point is matched with the model data to recognize the position of the object based on the image data.

In the object recognizing method, the feature points in which the feature amount is calculated by the feature amount calculator preferably are within the search region determined based on the predicted position of the object, so that the number of matching candidate points is reduced. As a result, the computation load is reduced, and the recognition accuracy is improved.

The order of the plurality of steps described above is not limited. The plurality of steps may be executed simultaneously or in a partially overlapped manner.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 7A to 7D are explanatory views related to a detection method of a Harris feature point.

DETAILED DESCRIPTION OF THE PREFERRED EMBODIMENTS

Figure 1:
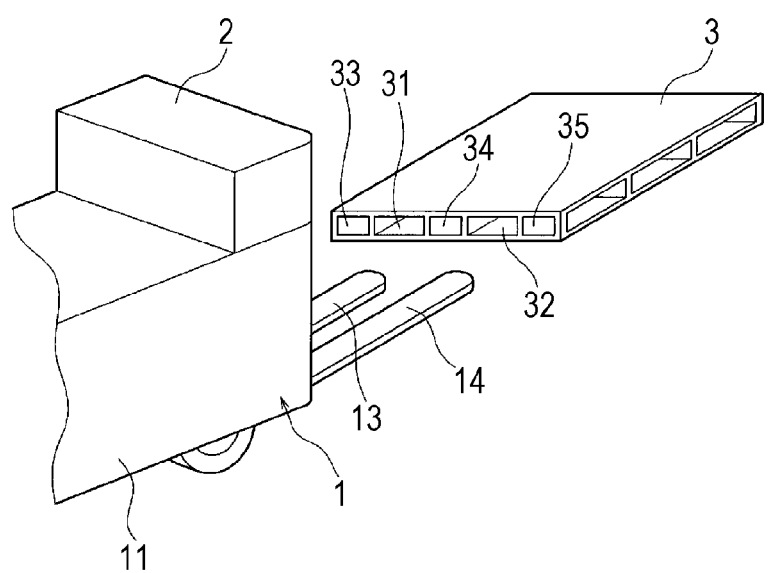
FIG. 1 is an explanatory view of an unmanned forklift.

An unmanned forklift will be hereinafter described as an autonomous vehicle according to a first preferred embodiment of the present invention. FIG. 1 is an explanatory view of the unmanned forklift. An unmanned forklift 1 includes a controller (not illustrated) installed inside, and a main body 11 that can autonomously travel based on the control of the controller. The unmanned forklift 1 includes a pair of forks 13, 14 disposed in a rising and lowering manner at a front surface of the main body 11, and lifts up and transports a pallet 3. Furthermore, the main body 11 includes an object recognizing device 2. The object recognizing device 2 includes a camera, which camera at least acquires image information of a front side of the main body 11. The object recognizing device 2 recognizes the pallet 3 to be recognized from a three-dimensional image based on the image information.

As illustrated in FIG. 1, for example, the pallet 3 includes inserting ports 31, 32 to which the forks 13, 14 can be inserted. Perpendicular planes 33, 34, 35 that interpose the inserting ports 31, 32 therebetween are provided on a surface on which the inserting ports 31, 32 of the pallet 3 are provided. The object recognizing device 2 detects a feature point representing a feature of the pallet 3 from the image data including images of the perpendicular planes 33 to 35 of the pallet 3, and also matches the feature point with the model data of the pallet 3. The object recognizing device 2 recognizes the pallet 3 in the image data in such a manner.

The unmanned forklift 1 transports the pallet 3 on which an article is placed in the warehouse, for example. The controller of the unmanned forklift 1 determines a current position in the environment of the warehouse, determines a travel path with the vicinity of the pallet 3 to be transported as a target position, and carries out the travel control. The object recognizing device 2 recognizes the position of the pallet 3 based on a direction of the image captured with the camera at the target position. The controller of the unmanned forklift 1 causes the unmanned forklift 1 to lift up the pallet 3 by inserting the forks 13, 14 into the inserting ports 31, 32 of the pallet 3, and then to move to the next target position. The article may be or may not be placed on the upper surface of the pallet 3. The object recognizing device 2 recognizes the pallet 3 in either case.

Figure 2:
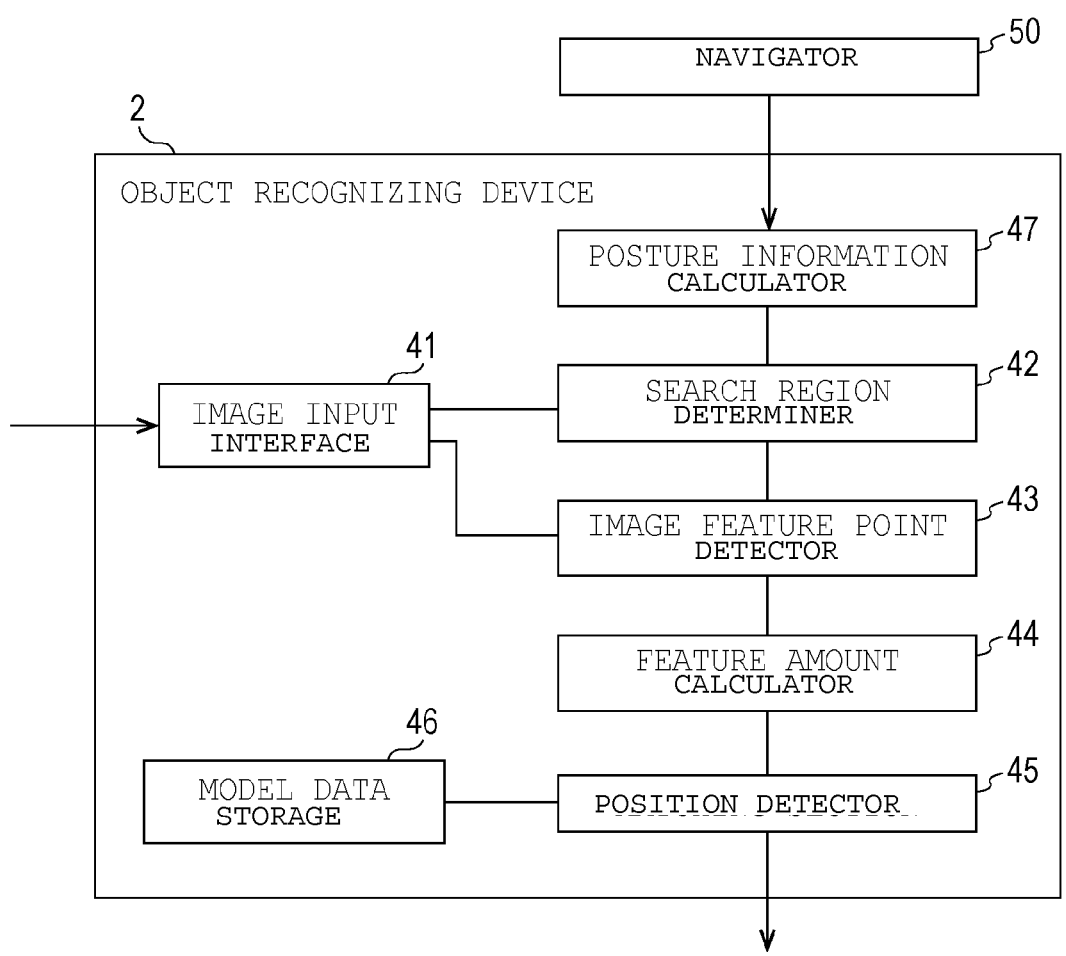
FIG. 2 is a block diagram illustrating a schematic configuration of an object recognizing device.

FIG. 2 is a block diagram illustrating a schematic configuration of the object recognizing device. The object recognizing device 2 is configured or programmed to include an image input interface 41, a search region determiner 42, an image feature point detector 43, a feature amount calculator 44, a position detector 45, and a model data storage 46. The image input interface 41 inputs image data of the periphery of the object recognizing device. The image data preferably is image data captured with the camera (not illustrated) disposed in the main body 11, and is three-dimensional image data including distance data. For the three-dimensional image data, for example, a feature point on a two-dimensional image preferably is obtained based on two two-dimensional images captured with two cameras at different positions, and a distance image including distance data captured with a distance sensor with respect to each feature point is obtained. In addition, the three-dimensional image data may be three-dimensional image data captured with a TOF (Time of Flight) camera.

The search region determiner 42 predicts the position of the object based on the image data, and determines a search region of a predetermined range including the predicted position of the object. For example, when the unmanned forklift 1 autonomously travels based on the travel control information transmitted from a navigator 50, the information including a travel path from the current position of the unmanned forklift 1 to the target position and the position information of the pallet 3 to be processed, the object recognizing device 2 preferably is configured or programmed to further include a posture information calculator 47 that calculates the current posture information based on the travel control information. When traveled in accordance with the travel control information transmitted from the navigator, the posture information calculator 47 calculates the posture information associated with the current position in the environment and the direction in which the main body 11 is directed. The current position preferably is determined through known self-location estimating techniques such as map matching, dead reckoning, laser induction, and magnetic induction.

The search region determiner 42 predicts the position of the pallet 3 on the image data based on the current posture information, and determines as a search region a predetermined range including the predicted position of the pallet 3.

Figure 3:
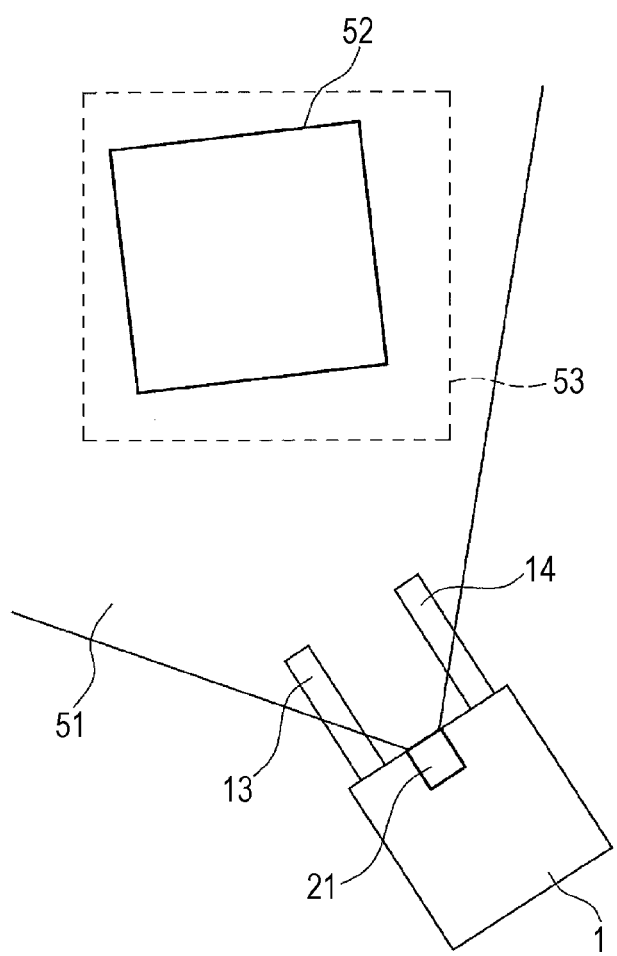
FIG. 3 is an explanatory view of a search region.

FIG. 3 is an explanatory view of the search region. The unmanned forklift 1 includes a camera 21, which camera 21 photographs the position more on the front side than the pair of forks 13, 14 disposed on the front surface of the unmanned forklift 1. As illustrated in FIG. 3, the camera 21 captures image data in a photographing range 51 included in a predetermined angle range on a front side of the unmanned forklift 1. The camera 21 may be disposed at front ends of the forks 13, 14. The search region determiner 42 determines a predicted position 52 where the pallet 3 is predicted to be placed based on the position information of the pallet 3 contained in the travel control information and the current posture information, and further determines a search region 53 of a predetermined range including the predicted position 52.

The image feature point detector 43 detects a feature point of the image data with respect to the search region 53. The image data preferably is a three-dimensional image, and the image feature point detector 43 detects the feature point by detecting a point where a change in color and shading is significant for each pixel of the three-dimensional image. The image feature point detector 43 is configured or programmed to detect the feature point through a method using the Harris operator, for example. In addition, the image feature point detector 43 is configured or programmed to detect the feature point through a method using the SIFT (Scale-Invariant Feature Transform) operator, and may also detect the feature point using a known technique, for example, the ISS (Intrinsic Shape Signatures).

The feature amount calculator 44 calculates a feature amount of a matching candidate point extracted from the feature point. Specifically, the feature amount calculator 44 is configured or programmed to extract the matching candidate point in performing pattern matching from the feature point on the three-dimensional image, and to calculate the feature amount of the matching candidate point. The feature amount preferably is calculated by a normal direction histogram generated based on an angle defined by a normal direction vector at each point and a normal vector of the peripheral feature points. Specifically, the FPFH (Fast Point Feature Histograms) preferably is used. The feature amount calculator 44 also preferably is configured or programmed to create a distance histogram at each point based on the distance data since the input image information is a three-dimensional image. In addition, the feature amount calculator 44 preferably is configured or programmed to create a luminance histogram based on luminance of each pixel and calculate the feature amount of each point.

The position detector 45 matches the feature amount of the matching candidate point with the model data to recognize the position of the pallet 3 on the image data. For example, the position detector 45 extracts a group of feature points in a specific geometric relationship among from the image feature points. For example, if a plurality of feature points exist at an edge where the perpendicular planes 33 to 35 of the pallet 3 make contact with a floor surface, the feature points positioned on the respective perpendicular plane 33 to 35 are on a straight or substantially straight line. In the relationship between the three feature points, therefore, line segments connecting the feature point positioned at the middle and two other feature points define an angle of 180 degrees or approximately 180 degrees. If the pallet 3 is consistent with the standard, the distance between the three feature points becomes a predetermined range. Accordingly, the position detector 45 assumes the three feature points as the matching candidate points if the three feature points are spaced apart by a distance of the predetermined range and the angle defined by the line segments connecting the respective points is within a predetermined range. Furthermore, the position detector 45 also preferably extracts the two intermediate points between the feature point positioned at the middle and the two other feature points as the matching candidate points, respectively. The position detector 45 thus carries out a down sampling of the feature point by selecting the matching candidate point to carry out the pattern matching.

The model data storage 46 stores the model data representing the geometric feature of the object. The model data is used to calculate the position and the posture of the object when recognizing the object based on the image data, and is assumed as the feature points obtained from the three-dimensional image of the object and the feature amount at the intermediate point of the feature points in the present preferred embodiment. The method used in the image feature point detector 43 is used for the extraction of the feature point. The method used in the feature amount calculator 44 is used for the method to calculate the feature amount of each point. The model data storage 46 preferably includes a predetermined region of an EEPROM, a RAM, a hard disk, and other storage devices, for example.

Figure 4:
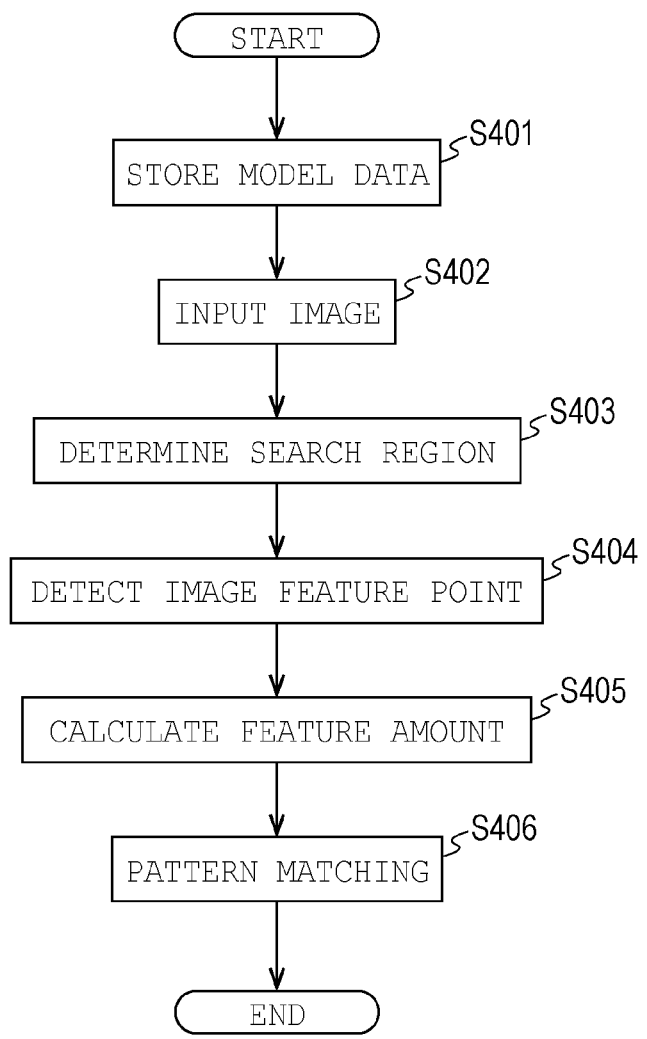
FIG. 4 is a flowchart illustrating a schematic configuration of an object recognition process.

FIG. 4 is a flowchart illustrating a schematic configuration of the object recognition process. The object recognizing device 2 realizes each function block illustrated in FIG. 2 by having a controller (not illustrated) configured with a microprocessor including a CPU, a ROM, a RAM, and the like, execute a predetermined program. Each of the function blocks is configured or programmed to function as the object recognizing device 2 by executing each step illustrated in FIG. 4. In step S401, the controller stores the model data of the pallet 3 to be recognized in the model data storage 46. Specifically, the controller extracts the feature point of the pallet 3 on the three-dimensional image data through the detection method using the Harris operator, for example, and stores the feature point in the model data storage 46 together with the geometric condition between the feature points. For example, the feature point can be assumed as a point corresponding to a position where the perpendicular planes 33 to 35 configuring the front surface of the pallet 3 make contact with the floor surface. The feature points in which the respective feature points are spaced apart by the distance of the predetermined range and the angle defined by the line segments connecting the respective points is within a predetermined range preferably is stored as model data in correspondence with the standard of the pallet 3.

Figure 5:
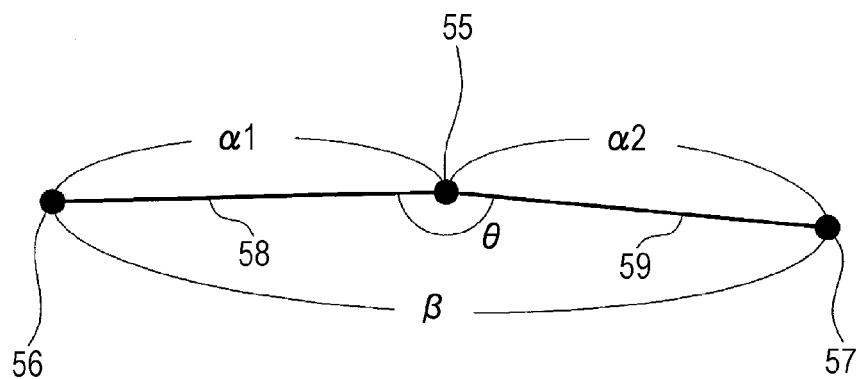
FIG. 5 is an explanatory view illustrating a geometric condition between feature points.

FIG. 5 is an explanatory view illustrating the geometric condition between the feature points. When the detection of the feature point using the Harris operator is carried out on the three-dimensional image information in which the pallet 3 is photographed, the three points positioned at the lower portion of the front surface of the pallet 3 preferably is extracted as the feature points 55 to 57. The three feature points each appear in correspondence with the edge where the perpendicular planes 33 to 35 of the pallet 3 make contact with the floor surface. Therefore, the three feature points appear aligned along a straight or substantially straight line. The feature point corresponding to the frontal shape of the pallet 3 preferably is extracted by extracting the three feature points such that a line segment 58 connecting the first feature point 55 and the second feature point 56 and a line segment 59 connecting the first feature point 55 and the third feature point 57 are in an angle range close to 180 degrees.

As illustrated in FIG. 5, the feature point positioned at the middle of the three feature points is assumed as the first feature point 55, and the feature points on both sides of the first feature point 55 are assumed as the second feature point 56 and the third feature point 57. A distance between the first feature point 55 and the second feature point 56 is assumed as $\alpha 1$, a distance between the first feature point 55 and the third feature point 57 is assumed as $\alpha 2$, and a distance between the second feature point 56 and the third feature point 57 is assumed as $\beta$. An angle defined by the line segment 58 connecting the first feature point 55 and the second feature point 56, and the line segment 59 connecting the first feature point 55 and the third feature point 57 is assumed as $\theta$.

If the pallet 3 has a size consistent with the standard, the values of the distance $\alpha 1$ between the first feature point 55 and the second feature point 56, the distance $\alpha 2$ between the first feature point 55 and the third feature point 57, and the distance $\beta$ between the second feature point 56 and the third feature point 57 are within a predetermined range. For example, the size of the T11-type pallet generally used in Japan is 1100×1100×144 (mm). Therefore, the values of the distances $\alpha 1$, $\alpha 2$ are about 500 (mm) and the value of the distance $\beta$ is about 1000 (mm). Thus, the geometric conditions in that the distances $\alpha 1$, $\alpha 2$ preferably are in the range of about 340 (mm) to about 600 (mm) and the distance $\beta$ is in the range of about 800 (mm) to about 1050 (mm) can be set.

The first feature point 55 to the third feature point 57 are on a straight or substantially straight line, and thus the angle $\theta$ is 180 degrees or substantially 180 degrees. Therefore, the geometric condition in that the value of $\cos \theta$ is smaller than or equal to about $-0.95$ can be set. The three feature points for pattern matching with a reference pattern of the pallet 3 are stably extracted by setting such geometric conditions.

The unmanned forklift 1 autonomously travels up to the target position. The target position is, for example, the vicinity of the place where the pallet 3 is placed. In step S402, the camera 21 photographs the periphery of the main body 11, and then the image input interface 41 inputs the image data. As described above, the image input interface 41 inputs the three-dimensional image data including the distance information obtained from the stereo camera, the TOF camera, and the other cameras.

In step S403, the search region determiner 42 determines the search region 53 in the image data. Specifically, the search region determiner 42 predicts the position of the pallet 3 based on the current posture information, and determines the search region 53 including the predicated position 52 where the pallet 3 is predicted to be placed. A region including at least some of the predicted positions 52 where the pallet 3 is predicted to be positioned on the image data is selected, and preferably, a region including all the predicted positions 52 is selected for the search region 53.

In step S404, the image feature point detector 43 detects the feature point in the image data. In particular, the image feature point detector 43 detects a plurality of feature points that satisfy a specific geometric condition corresponding to the feature of the pallet 3 by searching the inside of the search region 53 specified by using the search region determiner 42. In the detection of the feature point, for example, a point where color and shading change is extracted as the feature point for each pixel of the image data, and the detection method of the feature point using the Harris operator, the SIFT operator, and the like can be adopted. The specific geometric condition is a condition between the feature points corresponding to the feature of the pallet 3 to be recognized, as described above. For example, the condition is satisfied in a group of feature points spaced apart by a distance of a predetermined range corresponding to the standard of the pallet 3 and such that an angle defined by the line segments connecting the respective point is within a predetermined range.

In step S405, the feature amount calculator 44 calculates the feature amount for the feature point extracted as the matching candidate point. The feature amount calculator 44 creates the normal direction histogram through the FPFH in relation to the matching candidate point, and calculates the feature amount at each point.

In step S406, the position detector 45 obtains a similarity degree between the group of matching candidate points configured by the feature points and the model data to carry out pattern matching.

Figure 6:
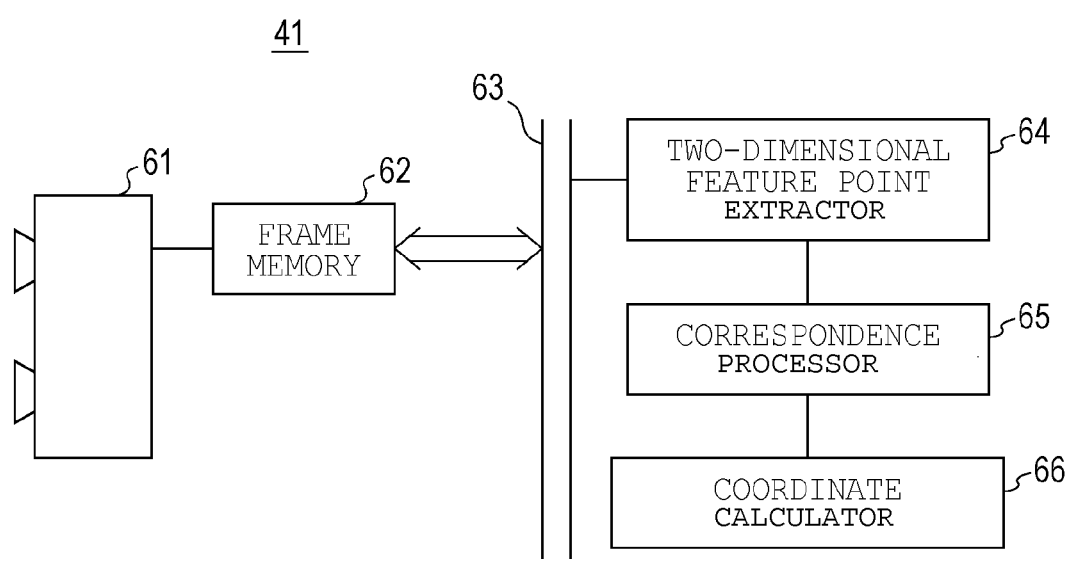
FIG. 6 is a block diagram illustrating one example of an image input interface.

A specific example of the image input interface 41 will be described below. FIG. 6 is a block diagram illustrating an example of the image input interface. The image input interface 41 illustrated in FIG. 6 generates a three-dimensional image including the distance information based on the image information from the stereo camera 61.

The stereo camera 61 preferably includes two cameras, disposed at different positions, to capture the two-dimensional image. The stereo camera 61 is attached, for example, to the front surface of the unmanned forklift 1. Each of the two cameras at least captures the two-dimensional image of the front side position of the forks 13, 14. The parameters associated with the position and the direction of the two cameras with respect to the unmanned forklift 1 are set in advance, and stored in a predetermined storage region of the object recognizing device 2.

A frame memory 62 stores two pieces of two-dimensional image information captured by the stereo camera 61. The two-dimensional image information stored in the frame memory 62 are provided to a two-dimensional feature point extractor 64 through an image bus 63. The two-dimensional feature point extractor 64 detects a two-dimensional feature point based on the luminance information for each of the two pieces of two-dimensional image information. In this case, a predetermined region of the two-dimensional image information preferably is cut out, and the feature point preferably is detected for the cut out predetermined region. If a predetermined pattern is provided in the perpendicular planes 33 to 35 of the pallet 3, the two-dimensional feature point extractor 64 preferably detects the two-dimensional feature point along such predetermined pattern. In this case, the two-dimensional feature point extractor 64 tracks the two pieces of two-dimensional image information in the same direction, detects a turning point at a periphery of the predetermined pattern, and assumes the relevant point as the two-dimensional feature point.

A correspondence processor 65 generates a candidate of a correspondence relationship between the two-dimensional feature points extracted by the two-dimensional feature point extractor 64. The correspondence processor 65 generates a transformation matrix with respect to the candidate of each correspondence relationship, obtains a transformation error, and extracts a candidate of the correspondence relationship in which the transformation error becomes a minimum.

A coordinate calculator 66 preferably calculates a candidate of each feature point of the candidates of the correspondence relationship extracted by the correspondence processor 65. For example, since the two pieces of two-dimensional image information by the stereo camera 61 are obtained by capturing the same point using the cameras at different positions, the distance information to the feature point is obtained. The coordinate calculator 66 generates a three-dimensional coordinate of each feature point based on the feature point of the two pieces of two-dimensional image information corresponded by the correspondence processor 65 to generate a three-dimensional image including the distance information.

The three-dimensional image preferably uses the image information captured with the TOF camera. The TOF camera measures the distance to the target by radiating an infrared light with an LED disposed at the periphery of the camera and measuring the time until a reflected light reflected from the target is observed with the camera. The TOF camera preferably measures the distance between the respective pixels forming the image, and generates a distance image displayed with luminance that differs according to the distance from the camera of each pixel. The correspondence processing of the two pieces of two-dimensional images needs to be carried out if the stereo camera 61 described above is used, but the processing time is reduced and the real time processing is carried out by using the image information captured with the TOF camera.

A method using the Harris operator is known for the image feature point detection method. In the detection method of the feature point using the Harris operator, a point where a sum of squares (SSD: Sum of Squared Difference) of the luminance value difference becomes large when the image within a predetermined region is microscopically shifted is detected. FIGS. 7A to 7D are explanatory views related to the detection method of the Harris feature point. Consider a case of microscopically shifting a predetermined region 72 set on an image 70 assuming an object image 71 exists on the image 70. As illustrated in FIG. 7A, if the predetermined region 72 is set on the object image 71, the change in the luminance value by the microscopic shift of the image 70 is small. Therefore, in such a case, the feature point is difficult to detect regardless of which direction the movement is made.

As illustrated in FIG. 7B, if the predetermined region 72 is set on the edge of the object image 71, the change in the luminance value is small with respect to the movement in the up and down direction of FIG. 7B, but the change in the luminance value is large with respect to the movement in the left and right direction of FIG. 7B. Therefore, the edge in the longitudinal direction is detected as the feature point by moving the image 70 in the left and right direction of FIG. 7B. As illustrated in FIG. 7C, if the predetermined region 72 is set near the corner of the object image 71, the change in the luminance value becomes large even if the image 70 is moved in any direction of FIG. 7C. Therefore, the corner position of the object to be recognized is capable of being detected as the feature point.

According to the detection method of the feature point using the Harris operator, if the object 74 is placed on the floor surface 73, as illustrated in FIG. 7D, a corner 75 making contact with the floor surface 73 is detected as the feature point. For example, a predetermined region 76 including the corner 75 is microscopically shifted and the feature point is detected based on the sum of squares of the luminance value.

Figure 8:
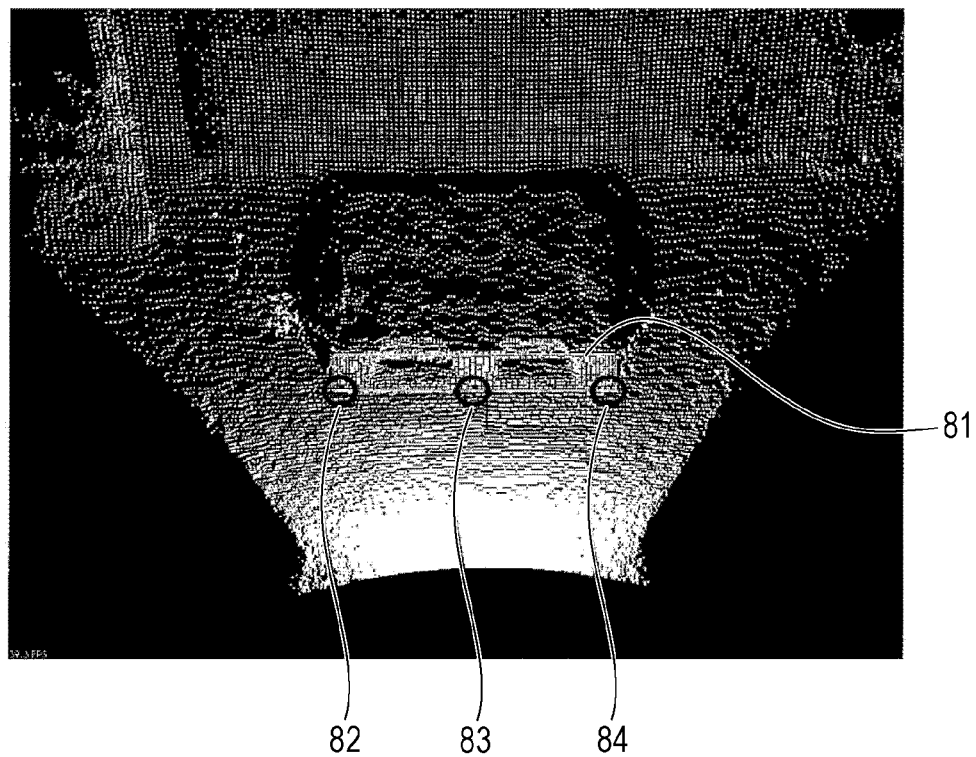
FIG. 8 is an explanatory view of a feature point detected using a Harris operator.

FIG. 8 is an explanatory view of a feature point detected using the Harris operator. In FIG. 8, the feature point appears in a great amount on a front surface 81 of the pallet 3 including the perpendicular planes 33 to 35 and the inserting ports 31, 32. In particular, as illustrated in a first region 82, a second region 83, and a third region 84, the feature point appears in a great amount at the edge portions where the perpendicular planes 33 to 35 of the pallet 3 make contact with the floor surface. When the scale is changed or when the image is rotated and the calculation of the Harris feature amount is carried out, a great amount of feature points similarly appear at the edge portions where the perpendicular planes 33 to 35 make contact with the floor surface. Thus, the pattern matching is efficiently carried out by extracting a group of feature points satisfying a predetermined geometric condition as a matching candidate point among from the feature points detected from the three-dimensional image information.

Figure 9:
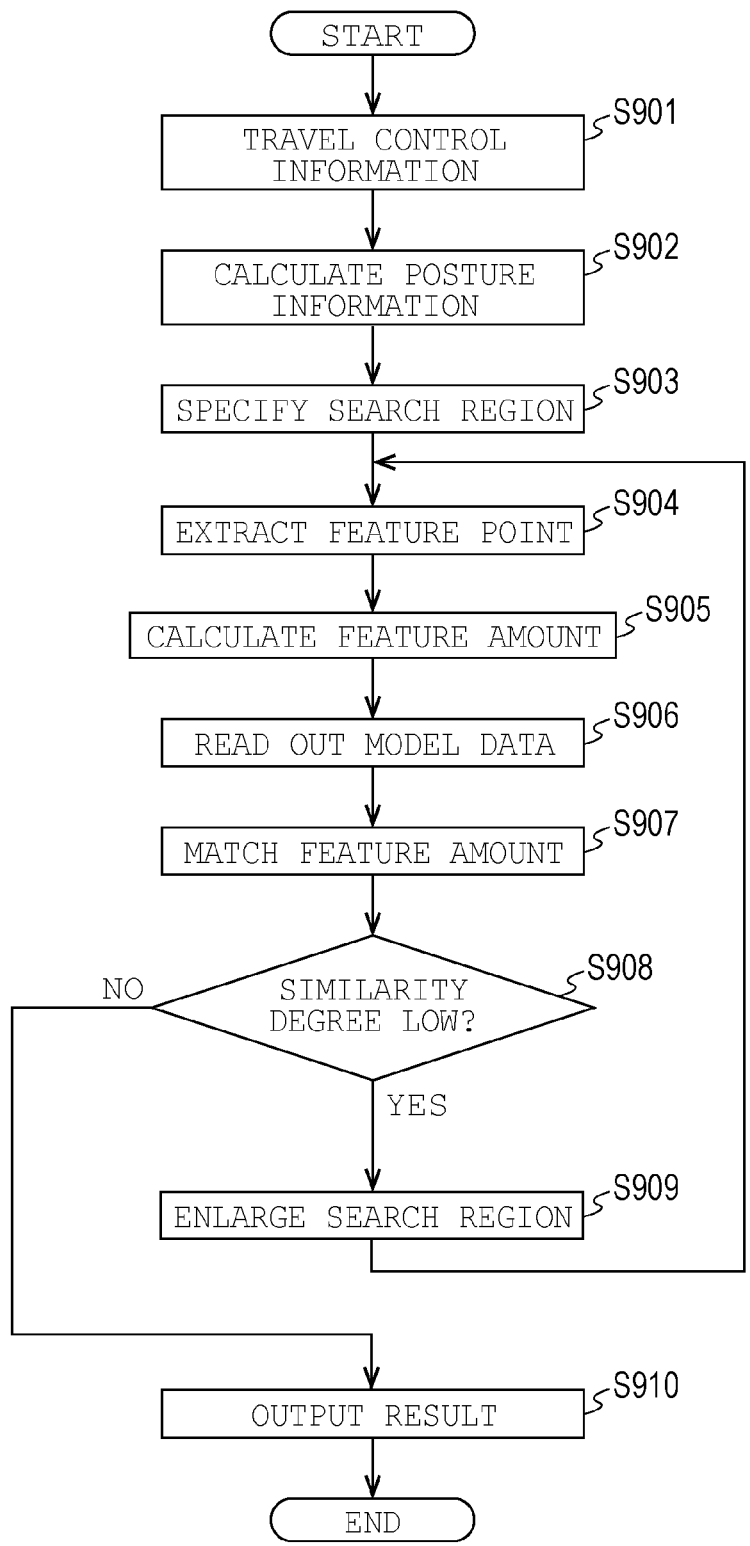
FIG. 9 is a flowchart from a search region determining process to a pattern matching process.

The position detector 45 compares the feature amount of the matching candidate point with the feature amount of the data of the two-dimensional model based on the detected feature points to carry out the recognition of the object on the image. The search region determining process to pattern matching process illustrated in steps S403 to S406 of FIG. 4 will be described in detail based on the flowchart illustrated in FIG. 9. FIG. 9 is a flowchart of the search region determination process to the pattern matching process. In step S901, the controller acquires the travel control information. For example, the controller receives the travel control information from the navigator that carries out the travel control of the unmanned forklift 1. The travel control information includes the information associated with the travel path and the position information of the pallet 3, which is the target object.

In step S902, the controller calculates the current posture information. For example, the current position in the environment, and the posture information related to the direction in which the main body 11 is directed are calculated according to the travel control information from the navigator. The current posture information is calculated from the rotation number of the motor when the unmanned forklift 1 actually travels on the travel path.

In step S903, the search region determiner 42 predicts the position of the pallet 3, which is the target object, from the current posture information, and determines the search region including the predicted position of the pallet 3. As illustrated in FIG. 3, the search region determiner 42 determines the predicted position 52 where the pallet 3 is predicted to be placed based on the position information of the pallet 3 included in the travel control information and the current posture information calculated by the posture information calculator 47, and further determines the search region 53 of a predetermined range including the predicted position 52. The search region 53 is a region including the predicted position 52 of the pallet 3. The search region 53 preferably is a region in which the predicted position 52 is enlarged in a predetermined range in view of the error of the current position that occurs by the travelling of the unmanned forklift 1, the position shift that occurs when the pallet 3 is placed, and the like.

In step S904, the image feature point detector 43 detects the feature point from a point group on the image data. Specifically, the image feature point detector 43 extracts the feature point on the image data using the detection method of the feature point using the Harris operator. The image feature point detector 43 extracts only the feature point existing within the search region 53 in the image data. Furthermore, the image feature point detector 43 extracts a point that satisfies a specific geometric condition between the feature points as the matching candidate point. If the target object is the T11-type pallet, as illustrated in FIG. 5, the three feature points that are extracted satisfy the geometric condition that the values of the distance α1 between the first feature point 55 and the second feature point 56 and the distance α2 between the first feature point 55 and the third feature point 57 are in the range of about 340 (mm) to about 600 (mm), the value of the distance β between the second feature point 56 and the third feature point 57 is in the range of about 800 (mm) to about 1050 (mm), and the angle θ formed by the line segments 58, 59 is cos θ≤−0.95, for example.

Figure 10:
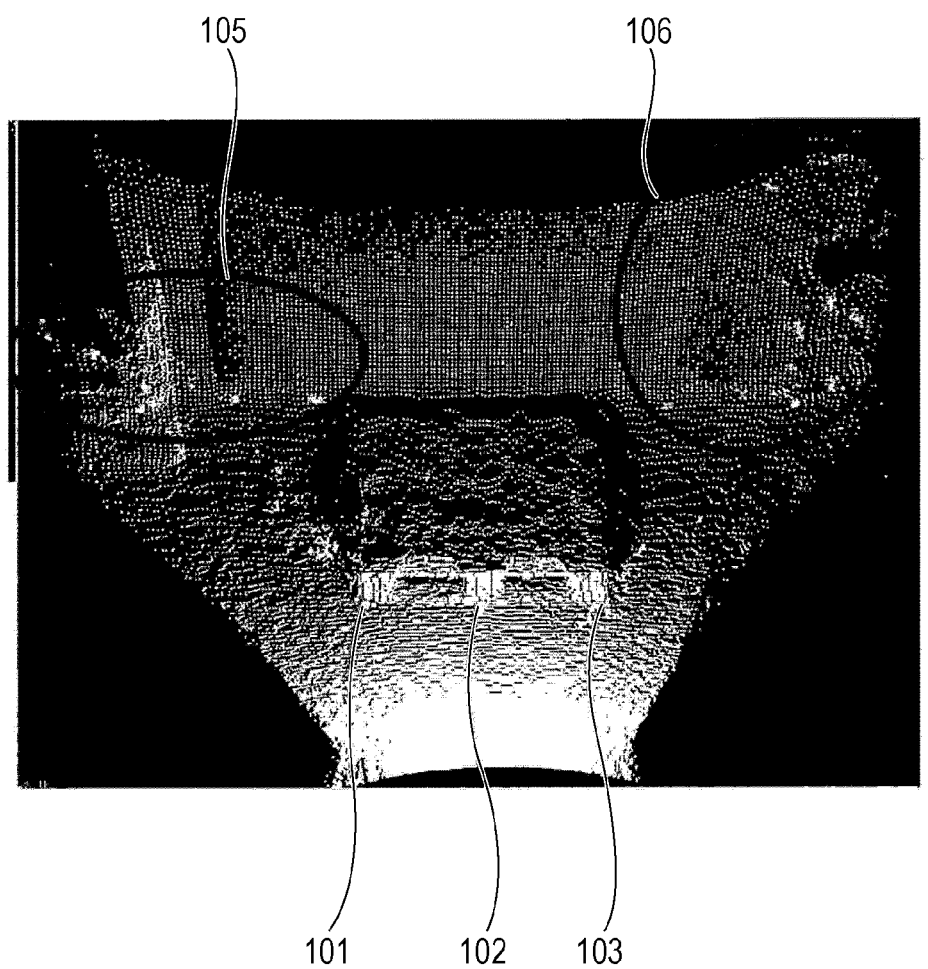
FIG. 10 is an explanatory view of a matching candidate point extracted by applying the geometric condition.

FIG. 10 is an explanatory view of the matching candidate points extracted by applying the geometric condition. FIG. 10 illustrates an example of a case of detecting the feature point of the entire image data without setting the search region 53. In this example, the matching candidate point having a similar feature exists in a first region 105 and a second region 106 where the pallet 3 does not exist other than matching candidate points 101 to 103 corresponding to the lower end edges of the perpendicular planes 33 to 35 of the pallet 3. However, the image feature point detector 43 carries out the detection of the feature point within the search region 53 in the vicinity of the predicted position of the pallet 3, and the detection of the matching candidate point appearing in the first region 105 and the second region 106 of FIG. 10 is not carried out.

In step S905, the feature amount calculator 44 calculates the feature amount for the extracted feature point. The feature amount preferably is calculated by the normal direction histogram generated based on the angle defined by the normal direction vector and the normal vector of the peripheral featuring point for each matching candidate point. Specifically, the FPFH (Fast Point Feature Histograms) preferably is used.

In step S906, the position detector 45 reads out the data of the two-dimensional model stored in the model data storage 46. When the pattern matching using the FPFH feature amount is carried out, the FPFH feature amount is calculated in advance based on the image in which the object to be recognized is photographed. The FPFH feature amount is stored in the model data storage 46 as the data of the two-dimensional model.

For example, the FPFH feature amount is calculated from a predetermined number of images in which the pallet 3 is photographed under various conditions in which the distance and the angle are changed. Furthermore, an average value and a dispersion value of the calculated FPFH feature amount are calculated, which are assumed as the model of the feature point. Assuming a total of 66 values, 33 average values and 33 dispersion values, of the FPFH feature amount as the model of one feature point, 198 values are stored in the model data storage 46 as the features of the pallet 3 for three feature points 118, 119, 120 positioned on the front surface of the pallet 3.

In step S907, the position detector 45 matches the feature amount of the matching candidate point with the feature point of the model data. Specifically, the controller calculates the difference between the FPFH feature amount of the model data and the FPFH feature amount of the matching candidate point.

In step S908, the position detector 45 determines whether or not the similarity degree between the matching candidate point and the model data is low. The position detector 45 determines that the similarity degree is high if the difference between the FPFH feature amount of the model data and the FPFH feature amount of the matching candidate point is smaller than or equal to a predetermined value and the process proceeds to step S910. The position detector 45 determines that the similarity degree is low if the difference is greater than the predetermined value and the process proceeds to step S909.

Figure 11:
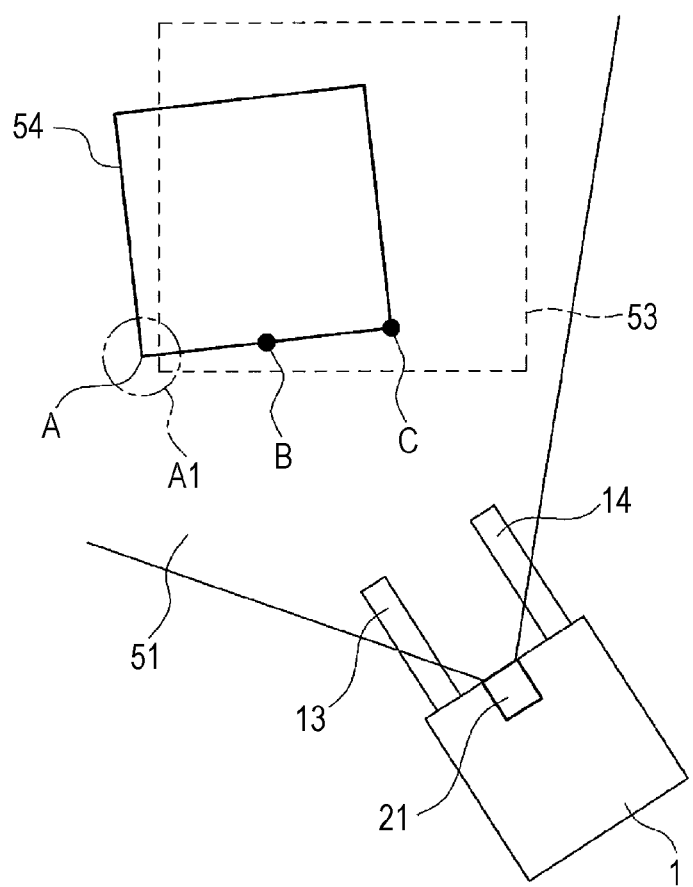
FIG. 11 is an explanatory view illustrating a case in which a portion of a target object is outside the search region.
Figure 12:
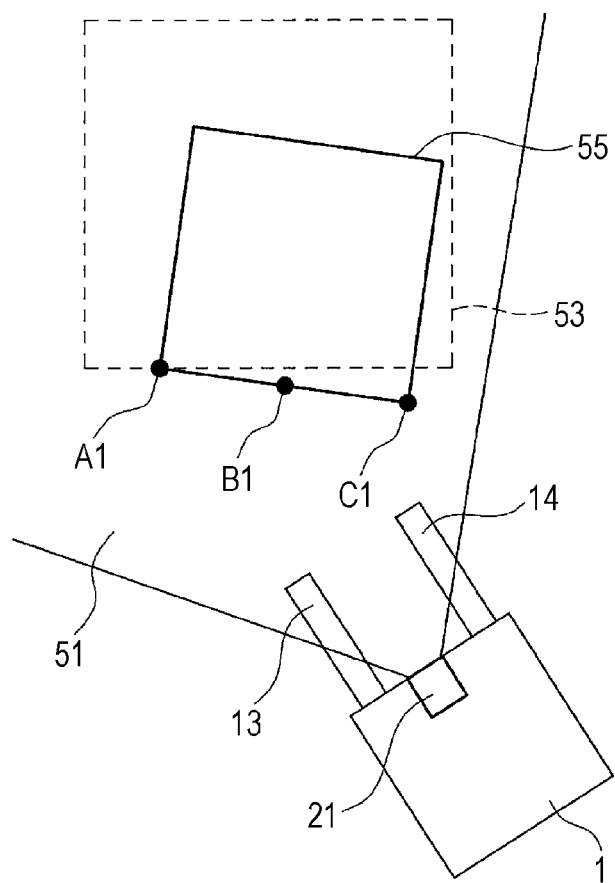
FIG. 12 is an explanatory view illustrating a case in which a portion of the target object is outside the search region.

In step S909, the search region determiner 42 enlarges the search region 53. FIGS. 11 and 12 are explanatory views illustrating a case in which a portion of the target object is outside the search region. In the example illustrated in FIG. 11, the current position 54 with respect to the search region 53 of the pallet 3 is the position illustrated in the figure, and regarding three feature points A, B, C satisfying the geometric condition described above, the feature point A is positioned outside the search region 53. In such a case, the search region 53 is enlarged to a range including a region A1 where a point satisfying the geometric condition is predicted to exist based on the feature points B, C.

In the example illustrated in FIG. 12, a current position 55 with respect to the search region 53 of the pallet 3 is the position illustrated in the figure, and all of the three feature points A, B, C satisfying the geometric condition described above are positioned outside the search region 53. In such a case, the search region 53 is enlarged in the predetermined range to search for feature points A1, B1, C1 positioned outside the search region 53. For example, the search region 53 is enlarged to an entire image region photographed with the stereo camera 61.

When the search region 53 is determined, the error of the current position that occurs by the traveling of the unmanned forklift 1 and the amount of position shift that occurs when the pallet 3 is placed are taken into consideration, and the search region 53 is enlarged to the periphery of the search region 53 by enlarging such error. The controller again executes the steps S904 to S908 after enlargement of the search region 53. In step S910, the position detector 45 outputs the recognized result (position on the image data of the object). According to the result, the controller controls a travel driver and a forklift driver to execute the pallet processing operation.

In this preferred embodiment, the position of the pallet 3, which is the target object, is predicted based on the travel control information, and the search region 53 is determined based on the predicted object position. Thus, the computation load in extracting the feature point is reduced, the computation time is reduced, and the real time processing is enabled. Furthermore, since the recognition of the pallet 3 is carried out based on the feature points satisfying the specific geometric condition, the recognition accuracy is high. Although the pallet 3 is illustrated for a recognizing target, the recognizing target is not limited thereto, and various types of object can be recognized through a similar method.

In the preferred embodiment described above, the recognition of the object is carried out by using a plurality of feature points satisfying the specific geometric condition as the matching candidate points. In other preferred embodiments, the pattern matching using the interpolation point that does not appear as the feature point on the object is further carried out.

Figure 13:
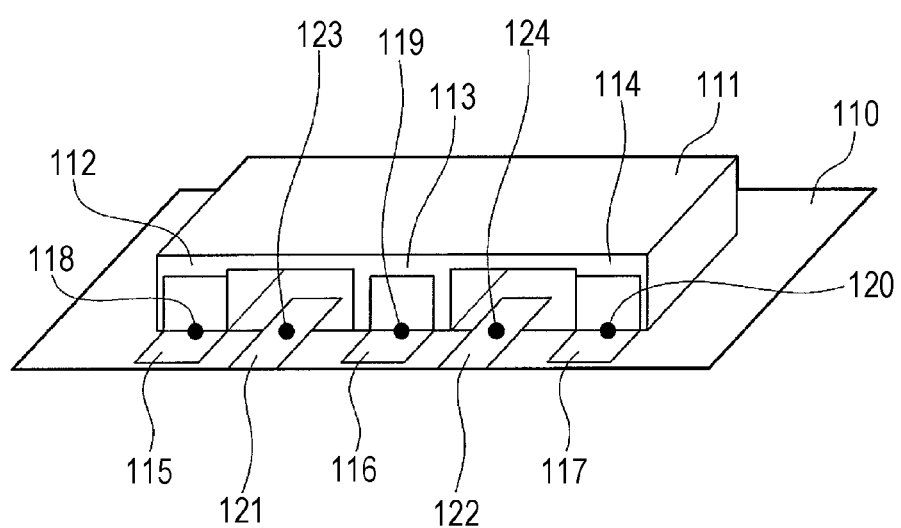
FIG. 13 is an explanatory view illustrating a relationship between feature points and interpolation points.

FIG. 13 is an explanatory view illustrating a relationship between the feature point and the interpolation point. In FIG. 13, an image in which the pallet 3 in FIG. 1 is photographed is illustrated as a pallet 111, and an image corresponding to the perpendicular planes 33 to 35 is illustrated as perpendicular planes 112 to 114. In the image illustrated in FIG. 13, the pallet 111 is placed on the floor surface 110, and the perpendicular planes 112, 113, 114 are provided on the front surface of the pallet 111. A first region 115, a second region 116, and a third region 117 exist corresponding to a bent plane defined by the perpendicular planes 112, 113, 114 and a portion of the floor surface 110. Feature points 118, 119, 120 appear at positions where the perpendicular planes 112, 113, 114 make contact with the floor surface 110 in the first region 115, the second region 116, and the third region 117.

A fourth region 121 and a fifth region 122 corresponding to a plane continuing from the floor surface 110 toward the inner side of the pallet 111 respectively exist at the intermediate of the first region 115 and the second region 116 and at the intermediate of the second region 116 and the third region 117. Interpolation points 123, 124 are set in the fourth region 121 and the fifth region 122, respectively. The interpolation point 123 is a point positioned at the intermediate on the three-dimensional coordinate of the feature points 118, 119. Similarly, the interpolation point 124 is a point positioned at the intermediate on the three-dimensional coordinate of the feature points 119, 120. The interpolation points 123, 124 are points satisfying the predetermined geometric condition with respect to the feature points 118 to 120, and a point directly or indirectly representing the feature of the object is selected. For example, a predetermined position on the upper surface of the pallet 3, a predetermined position of the side surface, and other points are capable of being selected as the interpolation points. The interpolation point is not limited to two points, and one or a plurality of interpolation points can be selected.

In the present preferred embodiment, the position detector 45 extracts the feature point and the interpolation point as the matching candidate point, calculates the feature amount of each matching candidate point, and matches such feature amount with the feature amount of the model data in the steps S904 to S908 of the flowchart illustrated in FIG. 9. In such a case, the position of the pallet 3 is capable of being recognized using not only the feature point originating from the shape of the pallet 3 but also the interpolation point irrelevant to the shape of the pallet 3. Similar to the previous preferred embodiment, the computation load is reduced by narrowing down the number of feature points to become the matching candidate points, and high matching accuracy is obtained by the pattern matching using the interpolation point.

The autonomous vehicle (e.g., unmanned forklift 1) preferably includes a travel vehicle main body (e.g., main body 11), a model data storage (e.g., model data storage 46), a photographic device (e.g., camera 21), a search region determiner (e.g., search region determiner 42), an image feature point detector (e.g., image feature point detector 43), a feature amount calculator (e.g., feature amount calculator 44), and a position detector (e.g., position detector 45). The travel vehicle main body (e.g., main body 11) is configured to autonomously travel to the target position. The data storage (model data storage 46) stores the model data related to the geometric feature of the object (e.g., pallet 3). The photographic device (camera 21) photographs the periphery of the travel vehicle main body at the destination to acquire the image data. The search region determiner (search region determiner 42) predicts the position of the object (pallet 3) based on the image data, and determines the search region (e.g., search region 53) of a predetermined range including the predicted position of the object. The image feature point detector (image feature point detector 43) detects the feature point (e.g., feature points 55, 56, 57; 101, 102, 103; 118, 119, 120) of the image data with respect to the search region (search region 53). The feature amount calculator (feature amount calculator 44) calculates the feature amount of the matching candidate point extracted from the feature point. The position detector (position detector 45) matches the feature amount of the matching candidate point with the model data to recognize the position on the image data of the object (pallet 3).

In the autonomous vehicle, the photographic device acquires the image data of the periphery of the autonomous vehicle after the travel vehicle main body autonomously travels up to the target position (e.g., step S402 of FIG. 4). The search region determiner then determines the search region (e.g., step S403 of FIG. 4). Furthermore, the image feature point detector detects the feature point of the image data (e.g., step S404 of FIG. 4). The feature amount calculator then calculates the feature amount of the matching candidate point extracted from the feature point (e.g., step S405 of FIG. 4). Furthermore, the position detector matches the feature amount of the matching candidate point with the model data. Thus, the position of the object based on the image data is recognized (e.g., step S406 of FIG. 4).

In such autonomous vehicle, the feature point where the feature amount calculator calculates the feature amount is within the search region determined based on the predicted position of the object, and thus the number of matching candidate points is reduced. As a result, the computation load is reduced and the recognition accuracy is improved.

Various preferred embodiments of the present invention are applicable to an unmanned forklift, an automatic guided vehicle, and in addition, a device that recognizes the position of the object and acts on the recognized object.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An unmanned forklift comprising:
a pair of forks disposed on a front surface of the unmanned forklift for insertion into a pallet that includes inserting ports;
a travel vehicle main body that autonomously travels to a target position based on travel control information;
a model data storage that stores model data related to a geometric feature of the pallet;
a photographic device that photographs a periphery of the travel vehicle main body at the target position to acquire image data; and
a controller; wherein
the controller receives the travel control information including a travel path from a current position to the target position and a position information of the pallet;
the controller calculates current self-posture information of the unmanned forklift based on the travel control information;
the controller predicts a position of the pallet in a warehouse based on the image data, and determines a search region of a predetermined range that corresponds to a portion of the warehouse that includes the predicted position of the pallet within the warehouse based on the position information of the pallet and the current self-posture information;
the controller detects a feature point of the image data with respect to the search region;
the controller calculates a feature amount of a matching candidate point which is extracted from the feature point; and
the controller matches the feature amount of the matching candidate point with the model data to recognize the position of the pallet based on the image data.

2. The unmanned forklift according to claim 1, wherein the controller extracts a plurality of feature points that satisfy a specific geometric condition from among feature points of the image data as matching candidate points.

3. The unmanned forklift according to claim 2, wherein when one or more of the plurality of feature points that satisfy the specific geometric condition do not exist in the search region, the controller enlarges the search region to the periphery to detect the feature point.

4. The unmanned forklift according to claim 3, wherein when a similarity degree with respect to the model data of the matching candidate point existing in the search region is less than a predetermined value, the controller enlarges the search region to the periphery and extracts the matching candidate point again.

5. The unmanned forklift according to claim 2, wherein the controller extracts, as the matching candidate points, three feature points appearing at an edge where three perpendicular planes of the pallet make contact with a floor surface.

6. The unmanned forklift according to claim 5, wherein the specific geometric condition is defined by a distance between a first feature point and a second feature point, a distance between the first feature point and a third feature point, and a distance between the second feature point and the third feature point, the first feature point being positioned at a middle of the three feature points, and the second feature point and the third feature point being on both sides of the first feature point.

7. The unmanned forklift according to claim 6, wherein the specific geometric condition includes an angle defined by a line segment connecting the first feature point and the second feature point and a line segment connecting the first feature point and the third feature point.

8. The unmanned forklift according to claim 2, wherein the controller selects one or more interpolation points that satisfy a predetermined geometric condition with respect to the plurality of feature points, and extracts the plurality of feature points and the one or more interpolation points as the matching candidate points.

9. The unmanned forklift according to claim 1, wherein the image data is three-dimensional image data.

10. The unmanned forklift according to claim 9, wherein the photographic device is a stereo camera including two cameras that capture two-dimensional images, a feature point on the two-dimensional image is obtained based on the two two-dimensional images captured with the two cameras, and a distance image includes distance data captured with a distance sensor with respect to each feature point.

11. The unmanned forklift according to claim 9, wherein the photographic device is a Time Of Flight camera that radiates an infrared light using an LED disposed at a periphery of the camera, measures a time until a reflected light reflected from the pallet is observed with the camera, and measures a distance to the pallet.

12. The unmanned forklift according to claim 2, wherein the photographic device photographs in front of the pair of forks.

13. The unmanned forklift according to claim 12, wherein the photographic device is disposed at a front end of one of the pair of forks.

14. The unmanned forklift according to claim 1, wherein the controller extracts a point where color and shading change as a feature point for each pixel of the image data.

15. The unmanned forklift according to claim 1, wherein the controller extracts the feature point based on a sum of squares of a luminance value using a Harris operator.

16. A pallet recognizing method for use with an unmanned forklift in a warehouse, the unmanned forklift including a pair of forks disposed on a front surface of the unmanned forklift and a travel vehicle main body, the pallet recognizing method comprising the steps of:
transmitting travel control information including a travel path from a current position to a target position and a position information of a pallet;
calculating current self-posture information of the unmanned forklift based on the travel control information;
causing the unmanned forklift to autonomously travel to the target position based on the travel control information;
storing model data related to a geometric feature of the pallet;
photographing a periphery of the travel vehicle main body at the target position to acquire image data;
predicting a position of the pallet based on the image data;
determining a search region of a predetermined range that corresponds to a portion of the warehouse that includes the predicted position of the pallet within the warehouse based on the position information of the pallet and the current self-posture information;
detecting a feature point of the image data with respect to the search region;
calculating a feature amount of a matching candidate points that is extracted from the feature point; and
matching the feature amount of the matching candidate points with the model data to recognize the position of the pallet based on the image data.

* * * * *